C. STILLE.
ELECTRO OPTICAL CELL.
APPLICATION FILED APR. 22, 1913.
1,108,638.
Patented Aug. 25, 1914.
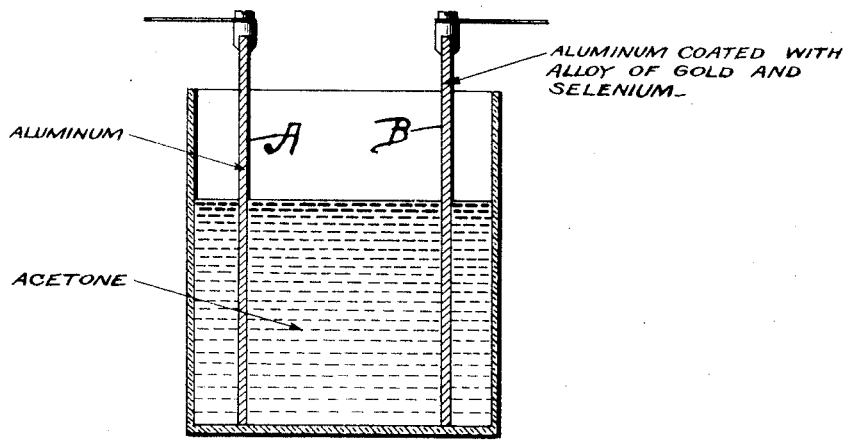

UNITED STATES PATENT OFFICE.

CURT STILLE, OF ZEHLENDORF-WEST, NEAR BERLIN, GERMANY.

ELECTRO-OPTICAL CELL.

1,108,638.

Specification of Letters Patent.

Patented Aug. 25, 1914.

Application filed April 22, 1913. Serial No. 762,923.

*To all whom it may concern:*

Be it known that I, CURT STILLE, a subject of the King of Prussia, and whose residence is Zehlendorf-West, near Berlin, Kingdom of Prussia, German Empire, have invented new and useful Improvements in Electro-optical cells; and I do hereby declare that the following is a full, clear, and exact description of my invention, which will enable others skilled in the art to which it appertains to make and use the same.

Cells which are sensitive to light are already known *per se*. Further it has already been proposed to employ halogen salts as electrolyte in connection with these cells. Particularly selenium and aluminium in plate-form have been employed as material for the electrodes, and acetone as the electrolyte.

The subject of the present invention is a particularly advantageous form of such a sensitive cell, namely the following:—Acetone is employed as electrolyte, and a bare aluminium plate and an aluminium plate which is coated with an alloy of gold and selenium as electrodes. One form of such a cell is shown in the accompanying drawings, wherein the letter A denotes the plate of aluminum and the letter B an aluminum plate coated with an alloy of gold and selenium; said plates being arranged in a suitable vessel containing acetone. In order to prepare the latter plate, the aluminium plate is coated with molten selenium and then heated several times up to temperatures above 200° C. until the selenium assumes a crystalline form, which is indicated by a silver-gray color. The plate is then allowed to cool down to about 90° C. and a thin layer of gold, for instance genuine gold leaf, is laid on. The plate is now again heated carefully up to about 170° C. The plate is now of a golden color and shines like brass.

The mode of employment is the following:—The cell is exposed to the rays of light which effect a chemical change or reaction, which is reversed when the cell is closed and the exposure stopped, and thereby an electric current is generated.

The cell can be used for instance in connection with distance photography, because the chemical reactions are proportional or nearly so to the intensity of the light and the duration of the action of the same. The image is in this case divided in a known manner into strips or lines and the individual strips exposed step by step, so that the illumination of the plate corresponds to the particular degree of brightness of the active portion of the surface of the image.

Having fully described my invention, what I desire to claim and secure by Letters Patent of the United States, is:

In a photo-electric cell the combination with acetone as electrolyte of two metallic aluminum plates, one of pure aluminum and the other of aluminum coated with an alloy of gold and selenium.

In testimony whereof, I have hereunto set my hand in presence of two subscribing witnesses.

CURT STILLE.

Witnesses:
VALDEMAR CHRISTENSE,
HANS TROYEL.